April 2, 1963 L. J. ANDRES 3,083,971

RECORD PLAYER TONE ARM

Filed Dec. 14, 1960 3 Sheets-Sheet 1

INVENTOR.

Lloyd J Andres

April 2, 1963 L. J. ANDRES 3,083,971

RECORD PLAYER TONE ARM

Filed Dec. 14, 1960 3 Sheets-Sheet 2

*INVENTOR.*

Lloyd J. Andres

RECORD PLAYER TONE ARM

Filed Dec. 14, 1960 3 Sheets-Sheet 3

INVENTOR.

United States Patent Office 3,083,971

Patented Apr. 2, 1963

3,083,971

RECORD PLAYER TONE ARM

Lloyd J. Andres, Miami, Fla., assignor to Rauland-Borg Corporation, Chicago, Ill., a corporation of Illinois Filed Dec. 14, 1960, Ser. No. 75,871
5 Claims. (Cl. 274—10)

This invention relates in general to phonograph record players and more particularly to a self-adjusting tone arm for automatic record changers.

Prior record changers for sequentially playing disc records in stacked position on a turntable incorporated tone arms adapted to tilt through a predetermined horizontal angle in order to play the lowermost through the uppermost record in the stack. Thus limiting the number of records playable at one loading and introducing distortion in the reproduction because of the wide variance in the angle of the axis of the stylus with respect to each recording in each successive record played in stacked relation.

It is well known in this art that one of the axioms for minimum distortion in reproduction is obtained only when the axis of the stylus is positioned in a fixed predetermined vertical angle with respect to the record groove.

The present invention overcomes the above objections and disadvantages and record capacity limitations by the provision of a tone arm control means which automatically positions the tone arm in predetermined substantially horizontal position corresponding with a constant stylus angle with reference to the upper surface of each successive record in the stack and is a principal object of the invention.

Another object of the invention is the provision of a control means for a tone arm whereby the descent of the tone arm to playing position over each successive record in a stack is arrested immediately following the contact of the stylus with the playing surface of each record.

Another object of the invention is the provision of a tone arm control means whereby during each playing cycle of a record changer, the tone arm is first raised to a predetermined height and then lowered to playing position substantially parallel to the surface of the uppermost record in the stack, in accordance with its height above the turntable.

A further object of the invention embraces a locking means for engaging and holding a tone arm in a record changer in a plurality of horizontal positions corresponding to the height of each record above the turntable responsive to the downward arrest of the playing stylus when contacting the playing surface of each record in the stack when the tone arm is lowered.

These and other objects and advantages in one embodiment of this invention are described and shown in the appended specification and drawings in which.

Figure 1:
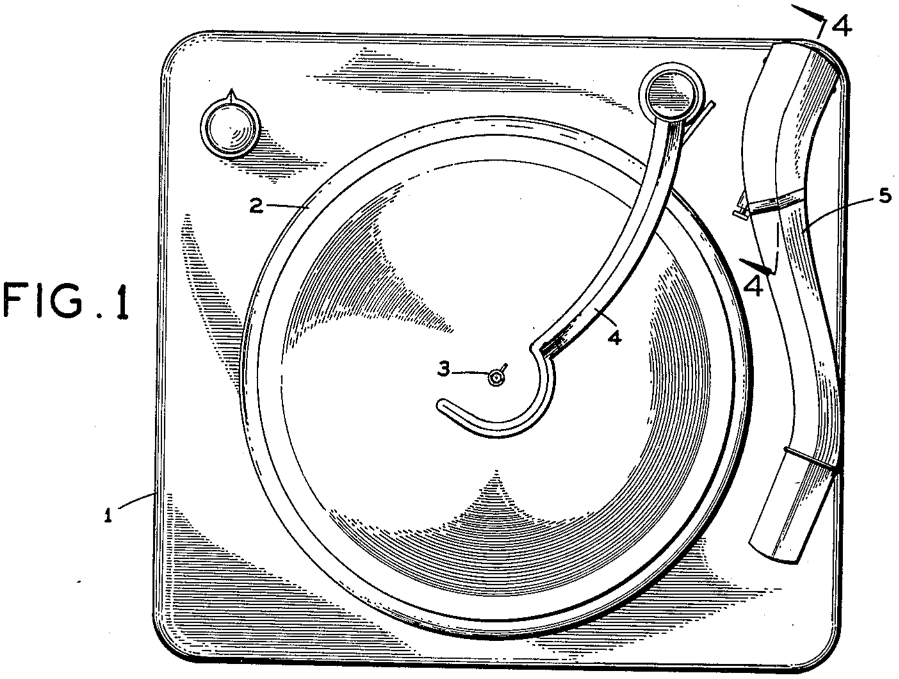
FIG. 1 is a plan view of a typical record changer incorporating a self-adjusting tone arm.

Referring to FIG. 1, a typical record changer is illustrated having a base 1, turntable 2 and a record spindle 3 for supporting a plurality of records in stacked relation above the turntable for playing. A hold-down arm 4 is swingably pivoted to support the stack of records in horizontal position. A tone arm 5 is pivoted for movement over the turntable by means hereinafter described and carries in the outer end thereof a transducer 6 and a stylus 7 shown in FIG. 2.

Each record is suspended above the turntable on the spindle 3 and is adapted to automatically release the lowermost record for descent to the turntable for playing in stacked relation thereon when the changer mechanism is automatically cycled, by means not shown.

Figure 2:
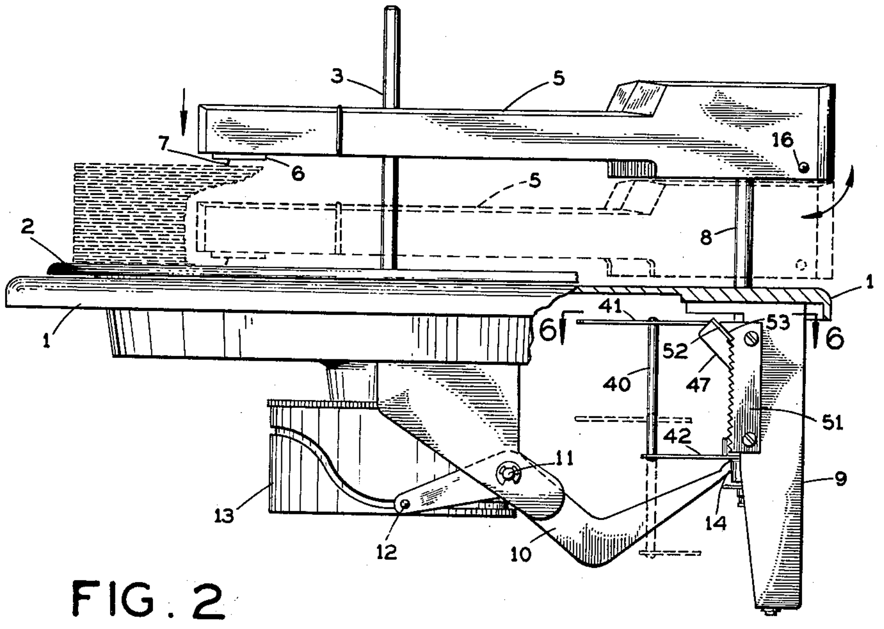
FIG. 2 is a fragmentary elevation of the tone arm portion of the record changer shown FIG. 1.

Referring to FIG. 2, the tone arm 5 is shown in horizontal position for playing a record deposited on the turntable 2 and is supported by mechanism to be hereinafter described by vertical tubular shaft 8 journalled for rotation and reciprocation in a support 9 which is secured to the underside of base 1.

Figure 3:
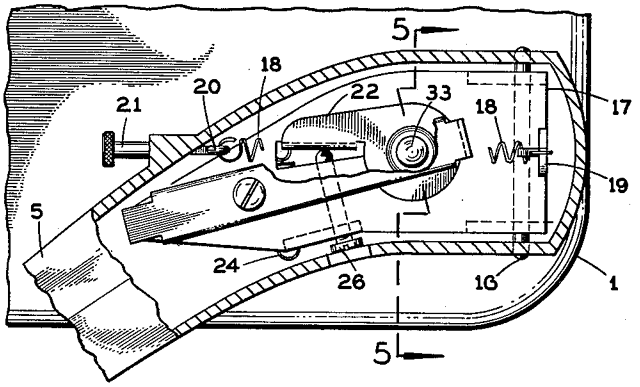
FIG. 3 is a fragmentary enlarged plan view of the tone arm shown FIG. 2 with the upper portion thereof broken away.
Figure 4:
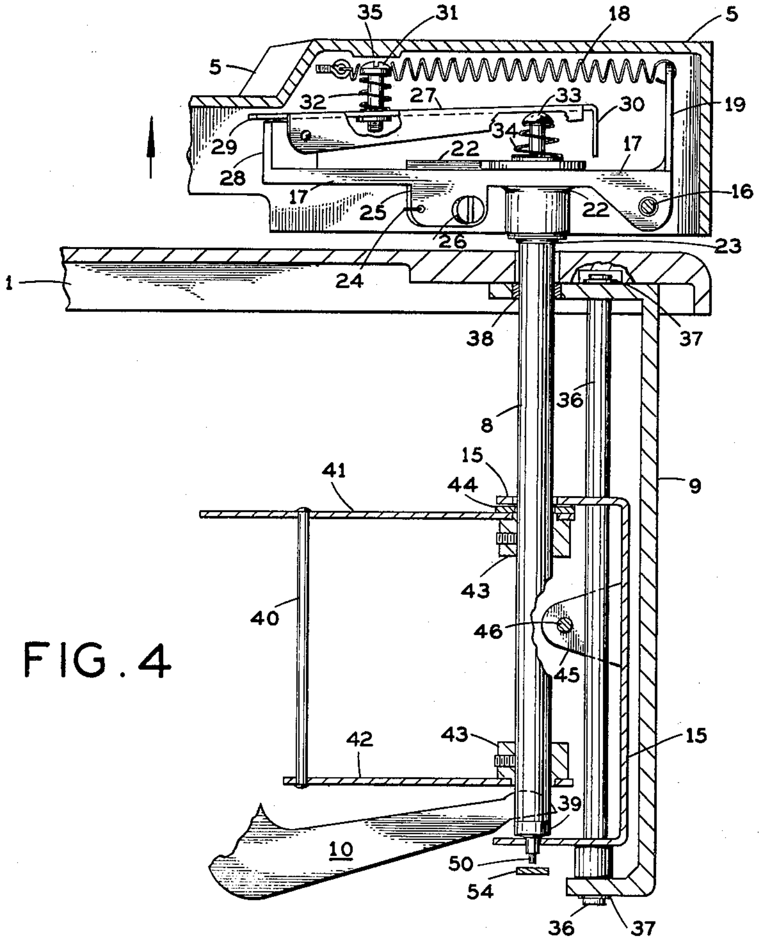
FIG. 4 is a fragmentary cross section elevation taken through section line 4—4 FIG. 1.

An elevator lever 10 is pivoted to a bracket secured to base 1 on a stud 11 and is oscillated by engagement of a follower 12 in a cylindrical cam 13, which cam is driven by a mechanism not shown, during each change cycle of the mechanism. The outer end 14 of lever 10 is positioned to engage the lower surface of arm 42 for raising the tone arm 5 to a maximum elevated position, shown in full lines, each time the record changer is cycled. Referring to FIGS. 3 and 4, the tone arm 5 is pivoted for vertical tilt a predetermined small angle to a substantially horizontal play position on pin 16 secured in tone arm support member 17 and is partially counter-balanced, less a predetermined stylus force, by spring 18 secured at one end to a riser 19 integral with tone arm support 17. The opposite end of spring 18 is secured in an eye of adjusting screw 20 retained by an adjustable thumb nut 21 in tone arm 5, as shown. Thus it is apparent that the gravity stylus force of the tone arm may be adjusted to a predetermined degree.

The support 17 is loosely retained on shaft 8 between a horizontal adjust lever 22 and a retention washer 23. A spring 24 is biased between lever 22 and a projection 25 integral with support 17, as shown. A horizontal adjust screw 26 is threaded through projection 25 and bears against lever 22. Thus the tone arm 5 may be accurately positioned in radial relation to shaft 8 by the adjustment of screw 26. It is to be noted that unwarranted manual movement of the arm in an outward direction will not injure the control mechanism, to be hereinafter described, by virtue of the protection afforded by the elongation of spring 24.

A trigger lever 27 is pivoted at one end on a vertical projection 28 of support 17 and adapted for vertical movement limited by stop portions 29 and 30 respectively. An adjust screw 31 is threaded in lever 27 and frictionally held in adjustment by coil spring 32, as shown, for presetting the tilt of arm 5. A sear plunger 33, slidably retained in the bore of shaft 8, is normally urged upward against the lower side of lever 27 by a light conical spring 34. Thus the tone arm is retained in a normal inactive rest position a small predetermined angle downward from its play position by virtue of the downward pressure of gravity against pad 35 bearing against the screw 31 and the stop portion 30 of lever 27 bearing against support 17. When the outer end of the tone arm is tilted upward a predetermined small angle, lever 27 and plunger 33 will rise by virtue of the action of spring 34 for tripping a lock means, to be hereinafter described.

Figures 5, 6, 7, 8:
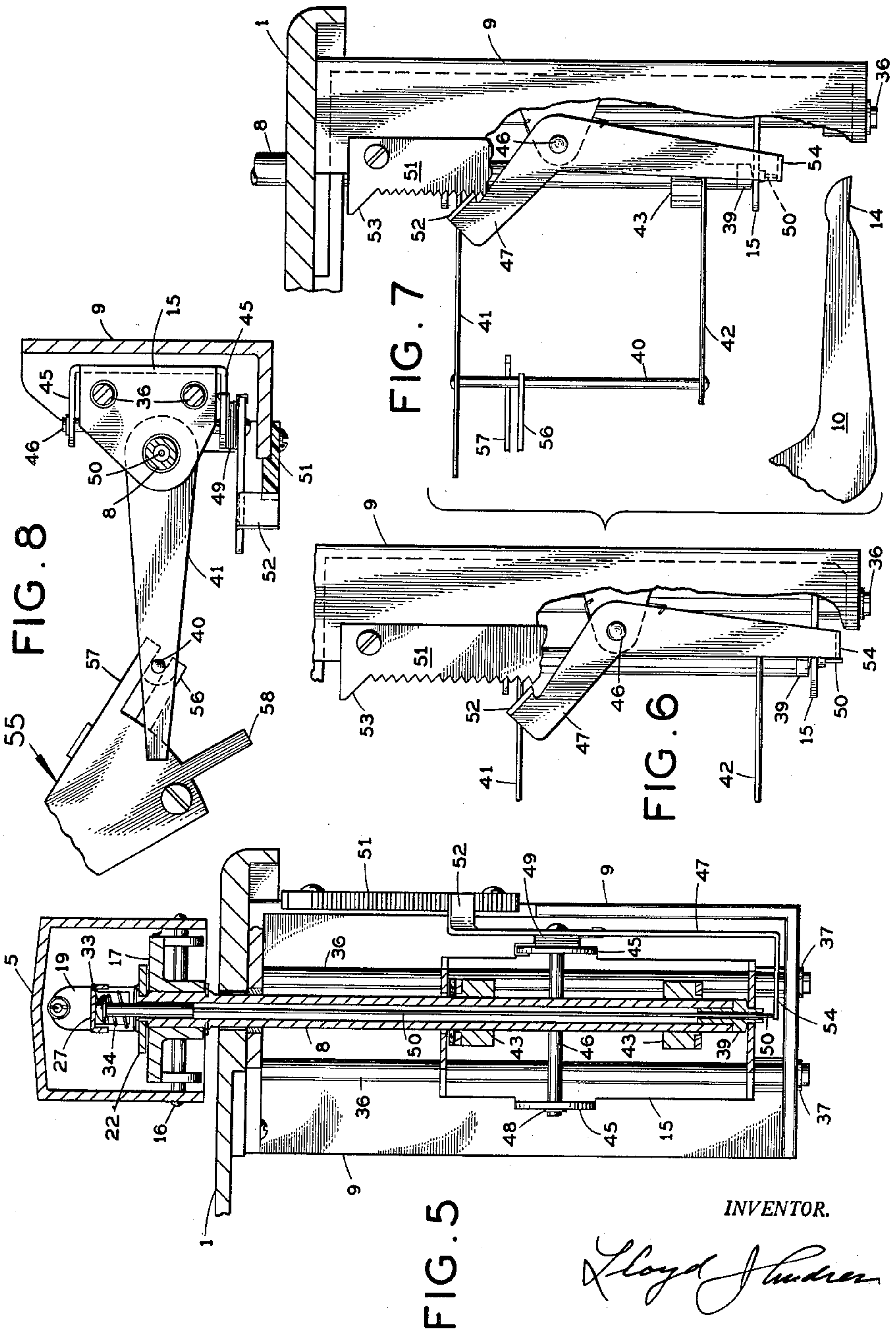
FIG. 5 is a cross sectional view taken generally through section line 5—5 FIG. 3.
FIGS. 6 and 7 are fragmentary elevations of elements shown FIG. 2 in changed positions.
FIG. 8 is a cross sectional view taken through section line 6—6 FIG. 2.

The carriage member 15 is slidably supported for vertical reciprocation with shaft 8 on a pair of rods or gibs 36—36 which are fixed between opposite ends thereof in support 9 by conventional C washers, better shown FIG. 5.

The upper portion of shaft 8 is journalled in a bearing 38 in support 9 and its lower end terminates in a bearing 39 retained in member 15, as shown. A control rod 40 is secured in spaced parallel relation to shaft 8 by upper and lower arms 41 and 42 fastened to bushings 43—43 respectively which are secured to shaft 8, as shown, which arms also serve to loosely retain member 15 for limited vertical movement with respect to shaft 8. Friction washer 44 is positioned around shaft 8 between arm 41 and the upper portion of member 15 with vertical clearance therebetween, the operation of which will be hereinafter described. Thus it is apparent that the tone arm 5, shaft 8, arms 41 and 42 and member 15 rest by gravity on elevator lever 10, when the latter is in the position shown FIG. 4, and are adapted to be raised and lowered thereby.

Referring to FIGS. 5 and 6, the carriage member 15 has formed integral therewith a pair of clevis arms 45—45 through which is journalled a shaft 46 secured to pawl member 47 retained in the position shown by C washer 48. A light torsion spring 49 is positioned between the pawl 47 and clevis member 45 and engaged to normally urge the pawl member 47 into clockwise rotation, as shown FIG. 6.

A sear pin 50, preferably made from small diameter wire, in the bore of shaft 8 is secured coaxially in sear plunger 33 at the upper end thereof and is slidably retained in coaxial relation through bearing 39 at its lower end portion, as shown FIG. 5. A lock plate 51 having relatively fine pitch linear teeth in one edge is secured to support 9 for engagement by pawl 52 which is integral with the pawl member 47. A cam 53 integral with plate 51 is provided to engage the pawl 52 and move lever 47 out of engagement with plate 51 and re-latch the end 54 with sear pin 50 when carriage 15 is elevated to its upper most position.

When the tone arm is in its inactive tilted position, the lower end 54 of the pawl member 47 is urged against the side of the projecting end portion of sear pin 50 holding the pawl 52 out of engagement with lock plate 51. Thus it is apparent that the carriage 15 and the tone arm 5 may be lowered from their uppermost positions to any one of the vertical positions corresponding to the teeth in plate 51 when drive lever 10 is lowered.

FIG. 8 shows a fragmentary portion 55 of the record changer mechanism which is adapted to oscillate in a horizontal plane, by means not shown, when the changer is cycled. The projections 56, 57 and 58 are adapted to alternately engage control rod 40 to laterally position the tone arm over a record on the turntable 2 and, after the playing of the record, to return the tone arm to its normal rest position, shown FIG. 1.

In operation, and referring to FIG. 1, the tone arm 5 is shown in its normal rest position at one side of the turntable. During each cycle of the record changer, a record will descend to the turntable 2 forming a stack thereon and the tone arm will swing when in its uppermost position laterally to a position over the starting groove of each record through the operation of portion 55, shown in FIG. 8. At this point, the rotation of the cam 13 will operate lever 10 and permit the tone arm to gravitate downward toward the uppermost record on the turntable. When the stylus 7 engages the surface of each record, the tone arm will tilt slightly upward due to the continuing lowering of shaft 8. This tilt will withdraw the sear pin 50 from holding engagement with the lower end 54 of pawl member 47 and permit same to rotate and engage pawl 52 with one of the teeth in plate 51 corresponding to the height of each record above the turntable and lock the tone arm in a substantially horizontal position for play. The lever 10 will continue its downward movement to a position shown in FIG. 7.

Upon the completion of the play of a record, the changer is cycled, by means not shown, and the lever 10 will rise and engage arm 42 which will first move upward independently of shaft 8 a sufficient distance to engage and move friction washer 44, shown FIG. 4, into contact with the upper arm of elevator 15. The continued upward movement of lever 10 will permit the tone arm to tilt by gravity and then be raised by virtue of contact with screw 31 with pad 35 and the friction afforded by washer 44 will resist the free rotation of shaft 8. This frictional engagement afforded by washer 44 will be maintained during all idle positions of the tone arm, in order to prevent lateral displacement of the stylus when the arm is lowered into the starting groove of each record since the portion 55 must be freed from control rod 40 and the arm must be free for lateral playing movement immediately following the stylus engagement with the record.

Thus it is apparent that the stylus 7 will play each record in the stack, illustrated in FIG. 2, at substantially the same predetermined angle and that the number of records in the stack is limited only by the height of the spindle 3 and the vertical limits of movement of the tone arm mechanism described.

Certain modifications in construction utilizing the features above described are intended to come within the scope of the appended claims.

Having described my invention, I claim:

1. In a self-cycling record changer for playing the uppermost side of each of a plurality of disc records sequentially deposited on a turntable a means forming a base, a tone arm shaft having a coaxial bore therethrough journalled in said base for coaxial oscillation about and reciprocation along an axis adjacent said turntable and normal to the surface thereof, a tone arm support secured to the upper end of said shaft, a tone arm means pivoted on said support for predetermined vertical angular movement between an idle position and a play position including a stylus in the outer end thereof, means for tilting said arm into said idle position, a carriage journalled for reciprocation in said base parallel said shaft loosely retained thereon for pivotally supporting said shaft for predetermined vertical movement and oscillation, a lock member on said base having a plurality of like linear teeth positioned adjacent and parallel said shaft, a pawl means journalled on said carriage for oscillation between a latched position and a tripped position into engagement with any one of said teeth depending upon the vertical position of said carriage for holding said tone arm in said play position for playing each of said records, means for normally urging said pawl means into said tripped position, a trigger means movably retained on said support including a sear portion in said bore of said shaft extending from the lower end thereof for movement between a latched and a tripped position, means for normally urging said trigger means into said tripped position, the end of said sear portion projecting from the lower end of said shaft for engagement with said pawl means for normally holding same in said latched position, said trigger means adapted to be engaged and depressed by said tone arm when the latter is in said idle position for holding said sear means in latched engagement with said pawl means and for tripping the latter into said tripped position during the movement of said tone arm from idle to said play position, operating means in said changer cooperatively associated with said shaft for sequentially moving same and said tone arm from a lower to an upper position and to swing same into predetermined register over each of said records when sequentially deposited in said stack, a cam means on said base in the path of movement of said pawl means for restoring same from said tripped to said latched position into engagement with said sear portion when said tone arm is moved to said upper position whereby the descent of said tone arm means will engage said stylus with each said record and operate said trigger means and trip said pawl means into locking engagement with one of said teeth corresponding with each of said records for holding the tone arm in said play position for playing each of said records when said changer is sequentially cycled.

2. In a record changer a tone arm mechanism for playing disc records with a constant stylus angle at different elevations comprising a means forming a base, a tone arm shaft having a coaxial bore therethrough journalled in said base for coaxial oscillation about and reciprocation along a vertical axis including a support member secured to the upper end thereof, a tone arm means pivoted on said member for predetermined vertical angular movement between a play and a downward tilted idle position including a stylus in the outer end portion thereof, means for urging said arm means into idle position, a carriage journalled for vertical reciprocation in said base loosely retained on said shaft for pivotally supporting the lower end thereof for predetermined oscillation and vertical movement of said shaft between predetermined upper and lower positions, a plurality of linear positioned like teeth on said base adjacent and parallel the path of movement of said carriage, a pawl means pivoted on said carriage adapted for movement from a latched position for scanning said teeth to a tripped position in engagement with one of said teeth dependent upon the vertical position of said carriage and tone arm when said pawl means is tripped, a sear pin slidably retained in said bore of said shaft extending coaxially a predetermined distance from the lower end thereof adapted to normally engage and hold said pawl means when moved into said latched position and when said pin is extended and to release said pawl means for movement into said tripped position when retracted, independent means for urging said pawl means and said pin into said tripped and said retracted positions respectively, a trigger means pivoted on said support member cooperatively associated with said pin and said arm for holding said pin in said extended position when the said arm is in said idle position and for permitting said pin to move to said retracted position and engage said pawl means with one of said teeth corresponding with the vertical position of said record when said arm is swung over said record and moved from said idle to said play position by engagement of said stylus with a said record during the descent of said carriage from said upper to said lower position.

3. The construction recited in claim 2 including a control member secured to said shaft for oscillating shaft and raising and lowering said shaft said arm and said carriage when operated, operating means in said changer adapted to engage said control member and raise, oscillate and lower same and disengage therefrom for tripping said arm into said play position on a record during the descent of same when said changer is cycled, a friction means retained between a portion of said control member and a portion of said carriage adapted and constructed to resist oscillation of said shaft and arm by the action of gravity of said carriage by the compression of said friction means between said portions when said control member is engaged and supported by said operating means.

4. In a tone arm mechanism for playing records at a plurality of elevations a means forming a base, a tone arm support means journalled in said base for oscillation about and reciprocation along an axis normal said base from a predetermined lower to a predetermined upper position, a tone arm means pivoted on said support means for predetermined angular movement between a play and a downward tilted idle position for playing said records when registered therewith, a ratchet means cooperatively associated with said base and said support means for movement from a latched idle position to a tripped position when released for holding said support means and said arm registered for playing each of said records in each of said plurality of positions, means for urging said ratchet means into said tripped position, trigger means movably retained in said support means cooperatively associated with said arm and said ratchet means adapted to hold said ratchet means in said idle position when moved thereto and for releasing said ratchet means to said tripped position when said arm is moved from said idle to said play position by registered engagement with each said record by the downward movement of said support means from its said upper position.

5. The construction recited in claim 4 including a fixed restore means on said base in the path of movement of said ratchet means adapted to move and restore the latter from said tripped to said latched position when the said support means is moved from said lower to said upper position.

References Cited in the file of this patent

UNITED STATES PATENTS

| | | |
|---|---|---|
| 2,158,295 | Mitchell | May 16, 1939 |
| 2,549,272 | Wennerbo | Apr. 17, 1951 |
| 2,984,491 | Cavallo et al. | May 16, 1961 |
| 3,042,410 | Brandizzi | July 3, 1962 |